March 22, 1966    G. A. BARONI    3,241,285
STRUCTURAL MEMBER FOR SUPPORTING LOADS
Filed May 27, 1964    6 Sheets-Sheet 1
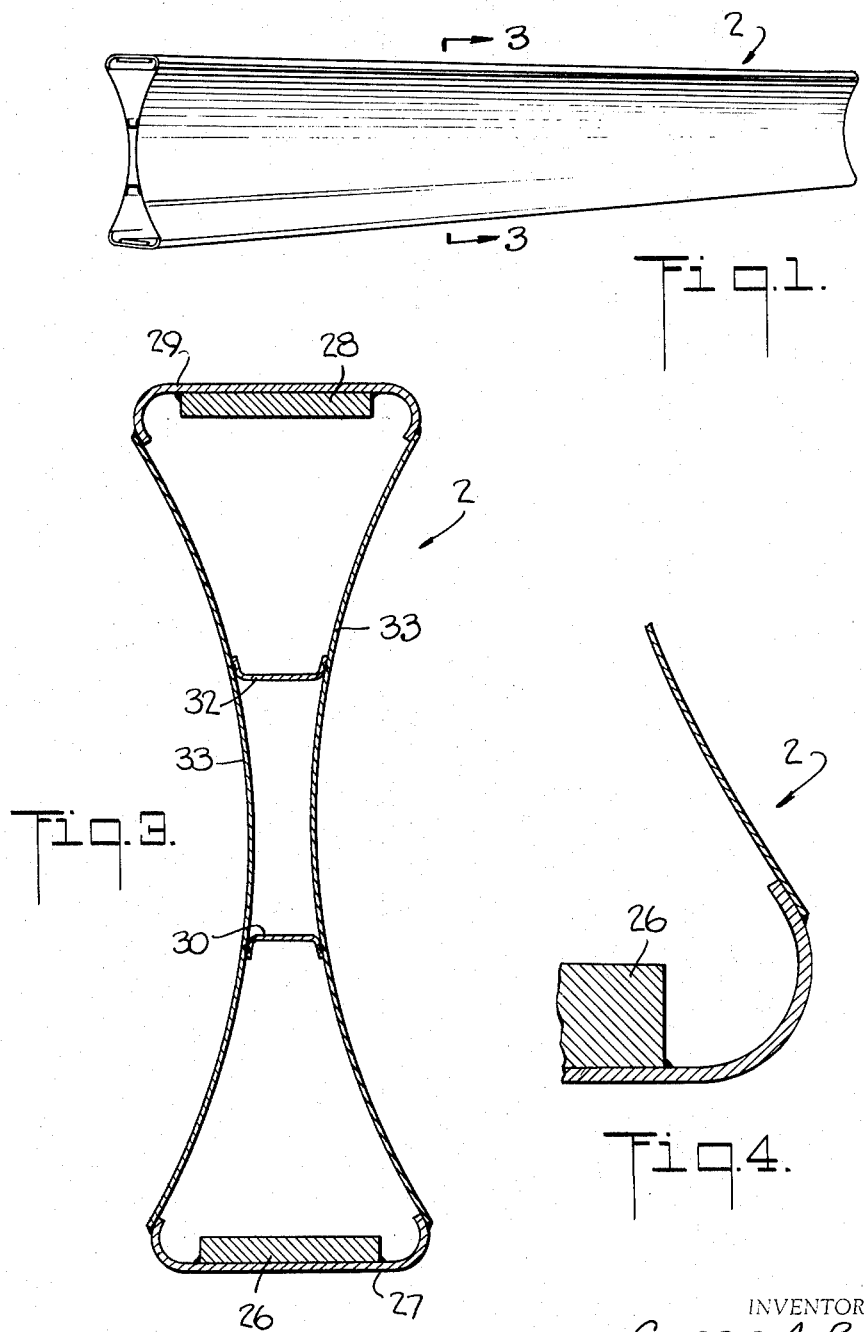
INVENTOR.
GIORGIO A. BARONI
BY
M. L. Pinell
ATTORNEY

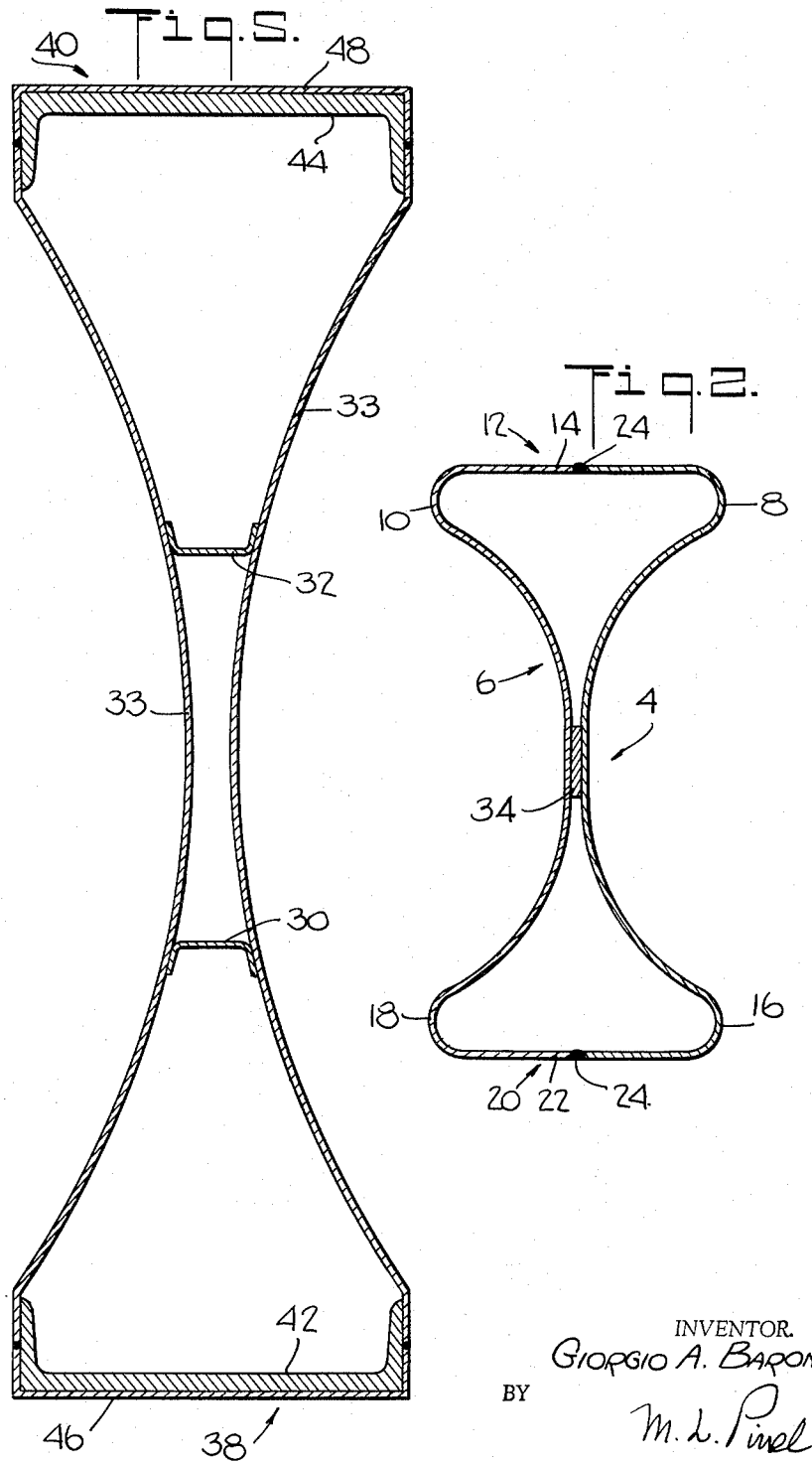

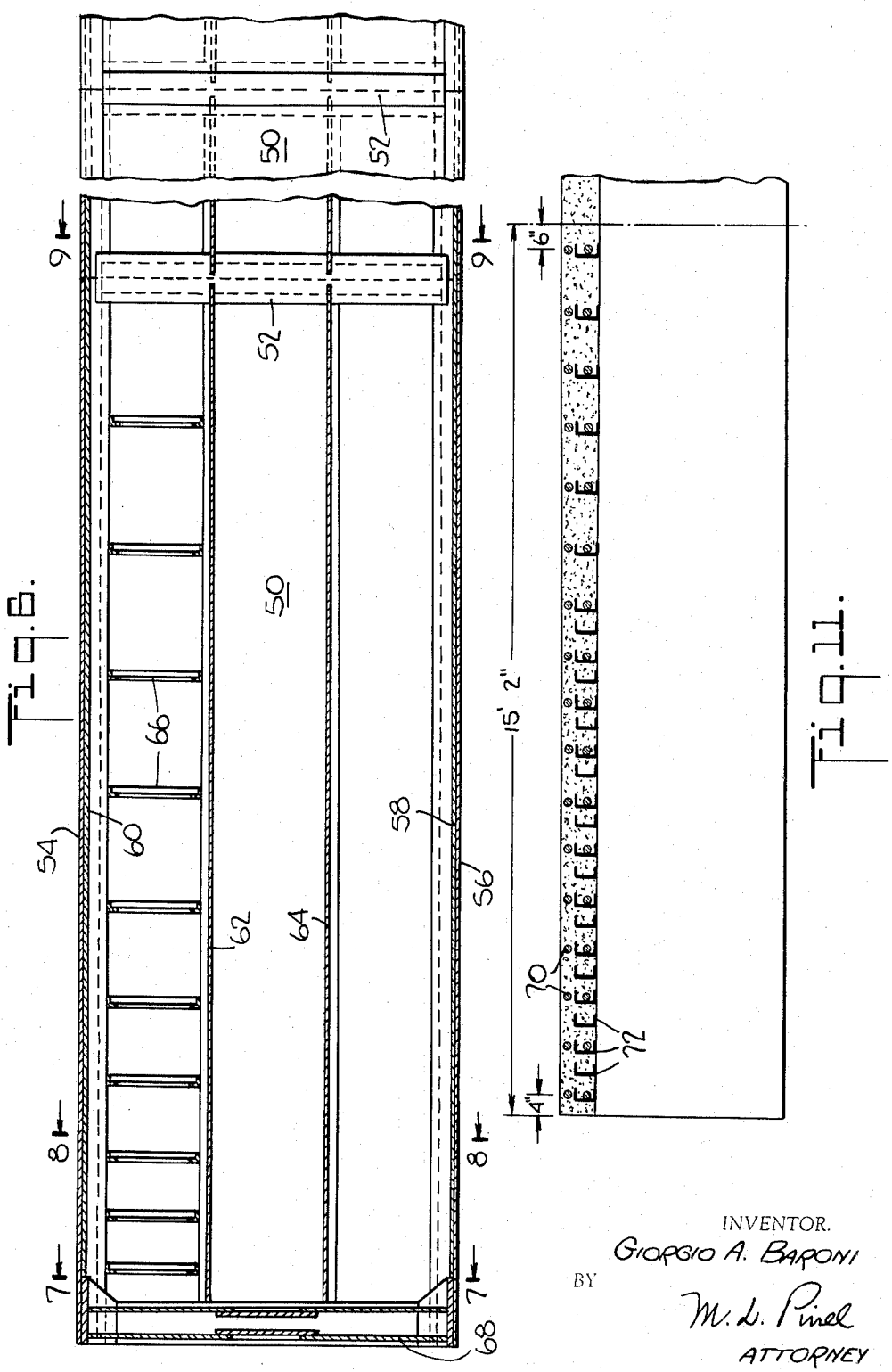

March 22, 1966  G. A. BARONI  3,241,285
STRUCTURAL MEMBER FOR SUPPORTING LOADS
Filed May 27, 1964  6 Sheets-Sheet 4
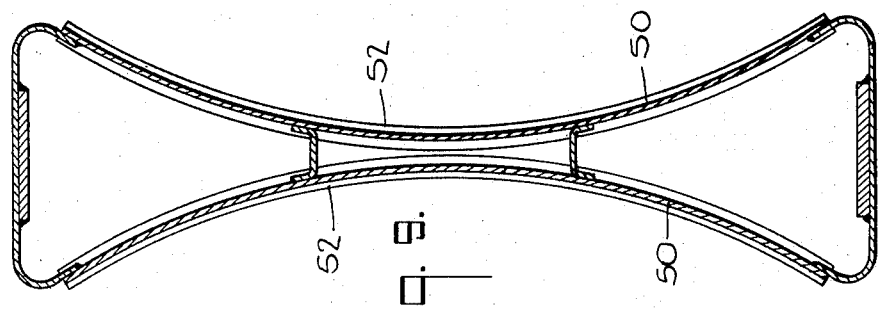
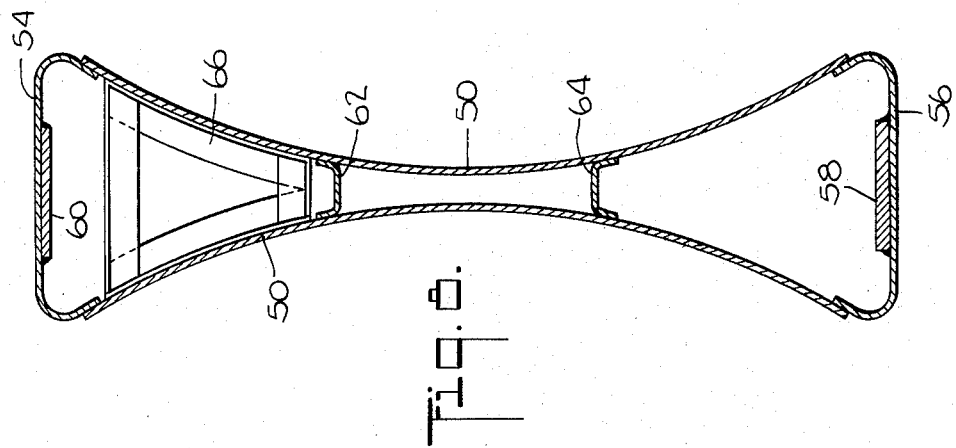
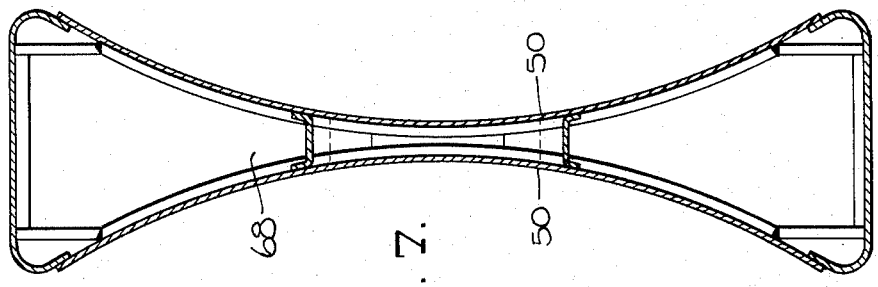
INVENTOR.
GIORGIO A. BARONI
BY
M. L. Pinel
ATTORNEY March 22, 1966    G. A. BARONI    3,241,285
STRUCTURAL MEMBER FOR SUPPORTING LOADS
Filed May 27, 1964    6 Sheets-Sheet 5

INVENTOR.
GIORGIO A. BARONI
BY
M. L. Pinel
ATTORNEY

United States Patent Office 3,241,285
Patented Mar. 22, 1966

3,241,285
STRUCTURAL MEMBER FOR SUPPORTING LOADS
Giorgio Alvise Baroni, New York, N.Y., assignor to The International Nickel Company, Inc., New York, N.Y., a corporation of Delaware
Filed May 27, 1964, Ser. No. 370,455
8 Claims. (Cl. 52—731)

This is a continuation-in-part of application Serial No. 275,899, filed April 26, 1963, now abandoned.

The present invention relates to structural members, and, more particularly, to load-supporting structural members, including beams for both long and short span high bridges, roofing sections and the like, of such novel configuration that heretofore prohibitively expensive materials such as stainless steel (as well as less costly materials) can be used in the fabrication thereof without incurring overall expenditures in excess of that involved in prior standard, conventional structural members having equivalent load-carrying capacity.

As is known to those skilled in the art, unique periods of transistion have been witnessed regarding the nature of materials used in forming structural members. For example, in bridge design these periods have included the change from wood to cast iron, to wrought iron, to plain and medium carbon steels, to a variety of low alloy steels and more recently to the so-termed high strength low alloy (HSLA) steels such as the nickel-copper steels. No less known are the factors which have contributed to these periods of change and economics dictate that these factors assume a role of major significance today.

As structural members were to be exposed to greater loads, the desire naturally arose for materials capable of withstanding the increasingly higher levels of stress which would be developed. Thus, materials of high strength, greater durability, etc., were required. To illustrate, in the rolled condition, plain carbon steels have a yield strength (an important criterion in the selection of metals) on the order of about 30,000 to 35,000 pounds per square inch (p.s.i.). While such a strength level is satisfactory for certain areas of use, there are far too many applications requiring steels of higher yield strength levels. Undoubtedly this contributed to the introduction of the low alloy and HSLA steels which afford yield strengths in the hot-rolled condition of 50,000 p.s.i. and above.

Of course, the HSLA steels, being relatively heavily alloyed, are more expensive than the plain carbon steeels; however, depending upon the application of use, thinner sections (less material needed) can be used and this somewhat narrows the cost differential and, thus, the overall long term cost (including maintenance) has been kept at a comparable level. Actually, it has been advanced that the nickel-copper HSLA steels can be used in short span bridges a tabout the same overall cost as A373 carbon steel. In addition, the nickel-copper HSLA steels have found relatively wide acceptance by reason of their comparatively good resistance to ambient corrosive environments, it being well documented that nickel-copper steels require less maintenance. Nonetheless, in minimizing maintenance cost it is common to paint various structural members, including those formed from the HSLA steels in an effort to mitigate damage due to deleterious corrosive attack. The overall cost of maintenance regarding a steel bridge has been said to approach (and, at times, substantially exceed) the original constructional cost, a point which lends emphasis to keeping maintenance at a minimum level.

It is perhaps worthy of mention, that since about the turn of the century it would appear that in the production of structural members such as beams for highway bridges, the emphasis placed on the mechanical and other properties of the materials used, e.g., yield strength has perhaps overshadowed the development of completely new structural beams. This apparent development, which has not evolved without good reason, is reflected, for example, by the conventional steel I-beam. Suffice to say, the I-beam has been in use for many decades and is still very much a standard. However, the critical stress, i.e., the lowest elastic buckling stress, the torsional stiffness, etc., characteristics of such beams are inherently self-limiting (albeit they be fabricated from the HSLA steels) at least to the extent that they often do no afford the capability of taking greater advantage of the properties of the materials used. Since the magnitude of loads and stresses which load-supporting members are called upon to withstand is continually on the rise, new structural concepts must be developed which will not only meet the demands imposed but do so within the bounds of economic considerations.

In addition to the consideration of higher loads and stresses, beams are called upon to accommodate spans of considerable length. It is known that the relation of shear force to bending moment generally decreases as the length of span increases. As a consequence, the full potential of the comparatively thick webs of hot-rolled I-beams (or H-beams) is too often not realized. Thus, with such beams of increasing span and under uniform loading the bending moment increases with the square of the span and rather quickly there results a substantial and undesirable increase in the dead weight of the beam in relation to live load. To offset this disadvantage, the depth of the beam could be increased; however, this gives rise to attendant fabricating problems and assumes that there would be sufficient clearance depth to accommodate such a beam of greater depth in the first instance. Other unattractive solutions suggest themselves. For example, box girders could be proposed but stability and other problems arise under high loads and stresses. In U.S. Patent No. 1,989,834 it was advanced that higher loads could be carried by I-beams if they were reinforced by supporting plates in the manner shown therein. While this proposal would not result in I-beams of greater depth, it necessarily would bring about greater dead weight, a dead weight which would increase in direct relation to a span of increasing length.

Nothwithstanding advances heretofore achieved with regard to load-supporting steel structural members, the need is ever present for structural members of unique structural arrangement which offer (1) lightweight construction (less dead weight than heretofore required, the comparison being made on a "same material" basis), (2) high strength, including high strength-to-weight ratios, (3) high critical and, thus, allowable stresses, high torsion stiffness, etc., and (4) good durability together with the capability of obviating the necessity of costly maintenance. The ultimate would be to eliminate maintenance while simultaneously not lending to appreciable increased original cost. The present invention is directed to meeting each of these objectives.

It has now been discovered that load-supporting members, e.g., beams, can be provided of such novel structural configuration that in accordance with the invention maintenance costs are or can be practically eliminated, initial cost is not appreciably increased over (and can be significantly lower than) that incident to conventional or standard members for the same intended uses, and the members are characterized by great durability and the ability to withstand exceedingly high loads notwithstanding the lightweight construction thereof. The foregoing is typified when considered from the view of the standard I-beam. To support a load as would be required for a standard steel I-beam, the structural members contemplated herein will support an equivalent load but require about one-half the weight or less of the standard I-beam and can be fabricated from the highly corrosion-resistant austenitic stainless steels.

It is an object of the present invention to provide special structural members of lightweight construction characterized by high strength, good durability and the capability of resisting loads or stresses which heretofore have required members of substantially greater weight.

It is another object of the invention to provide structural beam members which manifest substantially enhanced critical and therefore allowable stresses which in comparison with those characteristic of standard I-beams, afford the designer the opportunity of either using less dead weight to resist the same loads and stresses than required by an I-beam of the same outside dimensions or of using the same dead weight of the I-beam but resisting much higher loads.

A further object of the invention is to provide structural members fabricated from stainless steels and possessing high strength-to-weight ratios, the members being capable of withstanding high stresses and loads notwithstanding their lightweight construction.

The invention also contemplates providing structural members, such as beams for both long and short span bridges, which obviate the necessity of periodic maintenance otherwise required as a result of corrosive attack.

Other objects and advantages will become apparent from the following description taken in conjunction with the accompanying drawing in which:

FIGURES 1 and 3 represent perspective and sectional views, respectively, of an illustrative structural member contemplated herein;

FIGURE 2 depicts a sectional view of another structural member in accordance with the invention;

FIGURE 4 is a detailed view of one end of the lower section of FIGURE 3;

FIGURE 5 is a cross-sectional view illustrative of a preferred embodiment of a structural member contemplated herein;

FIGURES 6, 7, 8 and 9 are sectional views of a beam subjected to test as will be described hereinafter;

FIGURE 11 depicts the test beam in conjunction with a concrete slab thereon;

Figure 12:
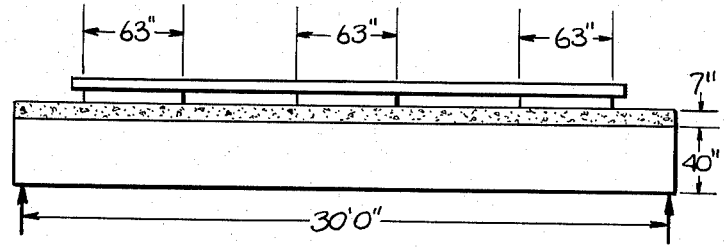
Figure 13:
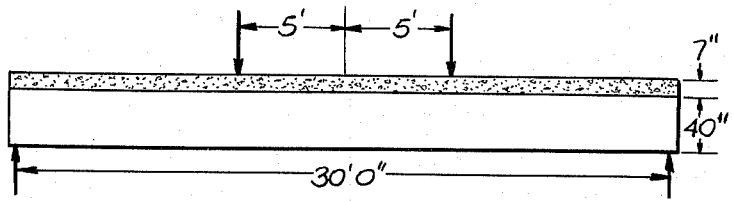
Figure 14:
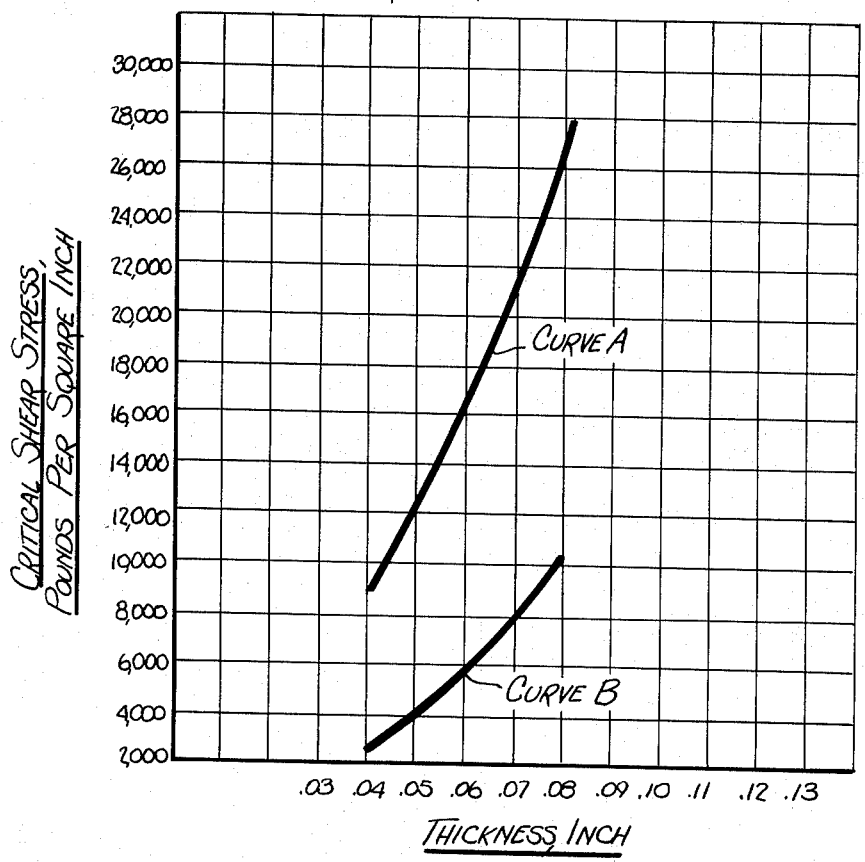

FIGURE 12 diagrammatically shows the manner of loading the test beam plus concrete slab under dynamic testing;

FIGURE 13 illustrates the loading pattern of the test beam plus concrete slab in destructive testing; and FIGURE 14 represents illustrative curves depicting a relationship between critical shear stress and thickness of webs.

In accordance herewith, the present invention contemplates structural members capable of resisting high stresses and loads and which are characterized by high strength, including high strength-to-weight ratios, and great durability. The members are of lightweight construction and will withstand loads and stresses equal to those which have heretofore commercially inherently required members of comparatively much greater weight utilizing conventional materials, e.g., the plain carbon or low alloy steels, including the HSLA steels. The difference between structural members within the invention and those commonly used heretofore is of such magnitude that in accordance with the invention even the desideratum of using the austenitic stainless steels can be achieved without giving rise to higher overall cost and while virtually eliminating maintenance. That is to say, the bending moment that can be resisted, the compression, tension, buckling and critical shear stresses, the torsional stiffness, etc., are of such high order that much thinner members can be employed than heretofore required by, for example, standard steel I-beam structures.

Generally speaking, structural members in accordance with the invention are comprised of a pair of relatively continuous and, advantageously, smooth, opposed but spaced-apart concave webs which are in affixed engagement with or extend into a pair of opposed flanges which are advantageously of channel-like configuration. The flanges usually and preferably have substantially flat surfaces which are in parallel relation with respect to each other to thereby facilitate, for example, attachment of shear connectors when the member is used as a beam in combination with a concrete slab. The concave or inwardly curved structural arrangement of the self-opposed webs extends substantially throughout the depth of the webs; however, in accordance with the preferred concepts of the invention, it is advantageous that a minor portion or segment of the extremities of each web be straight or of reversed curvature in relation to the curvature of the principal or major portion of the webs. Thus, the web extremities advantageously can be in substantially parallel relation as shown, by way of example, in FIG. 5. This feature importantly contributes to ease of fabrication of the structural members. The radii of curvature of the webs are substantially equal and a distinct feature of the invention is that the webs can be relatively thin or sheet like and, apart from other important considerations set forth hereinafter, this aspect also contributes to ease of fabrication. As mentioned above, it is advantageous that the flanges be of channel-like configuration (lower and upper members 27 and 29 of FIG. 3 and 38 and 40 of FIG. 5). In this connection and in accordance with another embodiment of the invention (FIG. 3), the substantially flat surfaces of the flanges extend into and form fillet sections of curved or convex contour with the radii of curvature thereof being substantially equal (which radii of curvature are generally less than that of the webs). In this embodiment, the fillets extend inwardly in relation to each other and with respect to the other channel. With the utilization of channel sections, shorter webs can be employed without otherwise adversely affecting the characteristics of the structural members, particularly in conjunction with one or more longitudinal diaphragms described hereinafter. While the interior of the member is hollow or substantially hollow, the webs afford an exterior appearance of a solid, smooth, concave-contoured configuration.

In carrying the invention into practice, it is most advantageous in providing high resistance to buckling and to accommodate greater load or stress-bearing capacity, that at least one diaphragm component, usually of a thickness greater than that of the webs, be employed between the opposed concave webs and along the longitudinal length thereof. This embodiment markedly increases the critical shear stress of the web (the lowest stress at which buckling is imminent) and, in this connection, a diaphragm extending the longitudinal length of the structural member and along the approximate midpoint of the webs increases the critical shear stress of the webs by a factor of about four; two appropriately located longitudinal diaphragms (e.g., 30 and 32, FIGS. 3 and 5) increases the critical shear stress of the webs by a multiple of about 9, etc. However, direct contact between the webs per se should be avoided, i.e., the webs should be spaced apart and not formed from a single piece, for example, whereby a joint would be formed. To do so, would be tantamount (apart from not contributing to a higher critical shear stress) to inducing or creating a "hinge" action, and this could undesirably affect the stability of the member, particularly in the case where environmental loads or forces (and reactions) are applied or act in an eccentric manner. Actually, the utilization of a longitudinal diaphragm between and along the approximate midpoint of the webs serves the additional function of preventing the webs from developing such flexibility as to act as a "hinge."

Where one or more longitudinal diaphragms are used, an important interrelationship exists between such a diaphragm and web thickness. This interrelationship offers the designer a substantial asset as to cost analysis and flexibility of dimensional design particularly when it is borne in mind that very thin webs can be employed. Either increasing the thickness of web or utilizing a longitudinal diaphragm results in raising the critical stresses. Thus, where the severity of conditions regarding the intended use of the member dictate the use of at least one longitudinal diaphragm, the designer has the option of increasing the thickness of the web and employing one such diaphragm or using thinner webs and two or more diaphragms. Under less severe conditions, the designer still has the choice of using thicker webs or using thinner webs coupled with at least one longitudinal diaphragm. Depending upon the intended application, weight reduction and cost analysis will normally determine or govern which embodiment will be adopted by the designer.

To assure the optimum in critical stress, certain relationships should be observed in accordance with the invention. Generally speaking, for a structural beam of given depth and web thickness critical shear stress decreases as the radius of curvature is increased (the central angle subtended by the arcuate web becoming smaller). Thus, where the radius of curvature is infinitely long, i.e., approaches infinity, the curvature of the webs approaches that of a straight line (somewhat in the manner of a box beam) and, apart from any other detrimental aspect, critical stress is markedly adversely affected. This is reflected illustratively by curves A and B (based on calculated results) shown in FIG. 14 wherein curve A is representative of a beam having webs about 34 inches in depth and having a radius of curvature of 30 inches with two longitudinal diaphragms located about 6 inches above and below the midpoint of the beam, and curve B is representative of a beam otherwise conforming to that of curve A except that its radius of curvature is infinitely long. For a web thickness of about 0.08 inch, the beam represented by curve A has a critical shear stress of the order of about 27,000 p.s.i. as compared to a critical shear stress of only about 10,000 p.s.i. for the beam represented by curve B and having the same web thickness. On the other hand, where the radius of curvature is relatively so small that the central angle subtended by the arcuate web approaches or is 180° (in this instance the concavity of the web is greatest and the chord of the arcuate web becomes the diameter of the circle generated by the radius of curvature) unnecessarily wide channel sections would be required and the member would be characterized by an undesirable degree of flexibility. In accordance with the preferred concepts of the invention, the central angle subtended by the arcuate or inwardly curved webs should be not less than 25° and not greater than 120° and most advantageously should be not less than about 35° and not greater than about 90°. The points on the webs used to measure the aforesaid angle are the points of tangency of the webs with the channel sections.

It is further most advantageous where the channel members extend into or form fillet sections as shown by way of example in FIG. 3 that the inside surface of either or both of the channel members be in engagement with a plate element as hereinafter described and shown at 26 and 28 in FIG. 3. This feature greatly contributes to the overall capacity of such structural members to withstand maximum load with greatest stability and since these plate elements can be made from carbon or low alloy steel, less stainless steel (if used) would be necessary in the channel members, thereby reducing cost. However, in FIG. 5, each of the channel members 38 and 40 are advantageously represented as duplex channel flanges comprised of channel sections 42 and 44 encased or substantially encased by stainless steel sections 46 and 48 which are in engagement (shown as welded) with the respective webs. Where the upper channel member 40 would be, practically speaking, completely protected from the ambient atmosphere, e.g., where the structural members are used as beams and the upper channel member is embedded in or protected by concrete, stainless steel section 48 would not be essential. In addition, a plurality of one or more appropriately spaced transverse stiffeners, as described hereinafter, can be used in the compression section of the beam as by welding or otherwise affixing the same to the respective inside surfaces of the webs. The use of such transverse diaphragms increases the critical stress and, where a particular design application requires, can be appropriately located to obviate, if desired, any eventuality of crinkling of the webs or the sides of the channel sections.

The aforedescribed structural members afford marked advantages over that of the conventional and standard I-beams fabricated from the same material. This is particularly apropos for the attainment of substantially higher critical and therefore allowable stresses. For example, the allowable compressive stress in the compression flange of a hot-rolled standard I-beam is considerably less than that of the present invention since, among other factors, the compression flange of the I-beam is unsupported along the outer edges thereof. In order to carry a given comparable load an I-beam of the same outside dimensions as a beam in accordance herewith would have to be much heavier (greater dead weight). The uniquely curved and opposed concave webs of the beams contemplated herein, notwithstanding the thinness thereof, e.g., 0.05 to 0.1 inch in thickness, impart, among other characteristics, lateral support to the channel section (flange) under compression and along substantially its entire length. Thus, the critical and the allowable compressive stresses for the compression flange are much higher than for a standard steel I-beam of the same length.

Further, due primarily to the unique curvature of the webs, structural members contemplated herein manifest a much higher critical shear buckling stress than, say, the web of a conventional I-beam. It has been calculated that the critical shear buckling stress of the beam in accordance with the invention is at least twice and up to several times above that of an I-beam (the web of the I-beam being calculated as a plate under shear), the material, dimensions (depth, width, thickness), etc., being the same.

In addition, the beam of the invention is greatly stiffer in torsion than a steel I-beam. This is a decidedly important factor since the measure of torsion stiffness (torsion constant) influences the lateral buckling of beams. The differential in the torsion constant of the beam in accordance herein and that of an I-beam is exemplified by the following: a standard hot-rolled steel I-beam 18 inches in depth and 6 inches in width (weight 54.7 lbs. per ft.) has a torsion constant of about 1.86 in.$^4$ whereas for the same weight and overall dimensions the beam within the invention has a torsion constant of over 50 in.$^4$ or over 25 times greater than that for the I-beam.

The foregoing improvement in capability of withstanding high loads, i.e., the development of high critical and allowable stresses, obtains notwithstanding the fact that both shear and at least part of the bending moment stresses are carried by, comparatively speaking, webs which can be exceedingly thin. Insofar as I am aware, there would appear to be a dearth of technical information regarding any curved structurally-supporting member having a segment as thin as that for webs contemplated herein and in which the thin segment has simultaneously borne the brunt of both shear and compression. This factor, among others, precipitated the performance of actual tests which are discussed hereinafter.

For the purpose of giving those skilled in the art a better understanding of the invention and a better appreciation of the advantages thereof, reference is made to the drawings and particularly to FIG. 2, wherein there is depicted, for purposes of illustration, a 12-inch (depth)

structural load-supporting member contemplated in accordance with the invention and of the general configuration of structural member 2 of FIG. 1. The webs, 4 and 6, respectively, are of opposed and spaced-apart concave configuration, the peripheral (outer) edge and the surfaces thereof being smooth and continuous. The upper regions of the webs extend into arcuately contoured fillet sections 8 and 10, respectively, which are shown to have the same radius of curvature (0.7 inch) but one which is substantially less than the radius of curvature (8.8 inches) of the opposing concave webs 4 and 6. The fillet sections 8 and 10 extend into or complete channel member 12 which has a substantially or relatively flat surface 14. Similarly, the lower regions of the webs extend into arcuately contoured fillet sections 16 and 18 which form into and complete channel member 20 which also has a substantially flat surface 22 which is in substantially parallel relation to channel surface 14. Reference numeral 24 represents a continuous smooth seam weld to simply illustrate the aspect that, if desired, the members can be formed of two primary W-like sections welded together.

As referred to above herein, for structural members required to withstand severe loads or stress, it is most advantageous to employ at least one internal plate element. Beam 2 of FIG. 1 (shown in section in FIG. 3) represents an embodiment of an 18-inch beam. It will be noted that the inside surfaces of the channel members 27 and 29 are in engagement with tension and compression flange metal plate elements 26 and 28, respectively. These flange plates (shown as welded to the channels) continue longitudinally the length of the beam. The tension flange plate element 26 alone or in combination with compression flange plate element 28 materially assists in providing greater load- or stress-bearing capacity to carry loads, high resistance to buckling and good stability. In like manner, members 42 and 44 in FIG. 5 perform the function of flange plates.

In addition, in FIG. 3 as well as in FIG. 5, a pair of longitudinal diaphragm components 30 and 32 are shown affixed (welded) to the interior surfaces of the spaced-apart webs 33 (formed of metal of sheet-like thinness) and these diaphragms also run the longitudinal length of the beam. While two diaphragms are shown in FIG. 3 one diaphragm element can be employed. For example, as in FIG. 2, it may be desired to have a minor portion of webs at about the midpoint thereof relatively flat in section and in this connection a single diaphragm component 34 comprised of a solid metal element can be employed. The configuration of the longitudinal diaphragms can be a single U- or channel-shaped member, a pair of opposed U- or channel-shaped members as shown in FIGS. 3 and 5, a solid plate member as shown in FIG. 2, a substantially hollow rectangular member, etc. Of course, other suitable configurations deemed appropriate by the designer can be employed. The presence of at least one longitudinal diaphragm greatly assists in counteracting buckling tendencies of the webs resulting from applied high loads and importantly contribute to the attainment of much higher critical shear stresses. In addition, as referred to before herein, these diaphragms minimize the possibility for the occurrence of the aforementioned "hinge" effect. It should be pointed out that where it is desired, the outer surface of the fillet sections can be welded to the inner surface of the web sections as shown in FIG. 3 and in greater detail in FIG. 4.

To illustrate the substantial lightweight structure of the support-bearing members contemplated in accordance with the invention in comparison with that required with conventional members, reference is again made to FIG. 3. The webs and channel members of the 18-inch beam depicted in FIG. 3 were fabricated from AISI 301 austenitic stainless steel which contains about 16% to 18% chromium, 6% to 8% nickel, up to 0.15% carbon, up to 2% manganese, up to 1% silicon and the balance essentially iron. The overall width of the beam was 6 inches and the thickness of the channel members was 0.15 inch, approximately twice the thickness (0.07 inch) of the thin webs. The width and thickness of the plate elements were 4.1 inches and 7/16 inch, respectively. For a span of 25 feet the total weight of the stainless webs and channels and the alloy steel plate elements would be about 31 pounds per foot (approximately 17 pounds of AISI stainless 301 and 14 pounds of alloy steel per foot). The moment of inertia of the beam, I, was determined to be about 1420 in.$^4$ To withstand a load of 4700 lbs./ft. a conventional 18-inch, wide flange (WF), I-beam which would be used under such conditions would weight about 85 pounds per foot as compared with the 31 pounds per foot for the beam in accordance with the invention. For this 25-foot span and load a net reduction of about 1350 pounds dead weight is achieved.

Since the literature is practically devoid of theory which could be relied upon without reservation in predicting the behavior of the structural member of the present invention under high shear stresses and since, insofar as I am aware, no beam of the kind involved herein has been advanced heretofore, particularly one having exceedingly thin curved webs exposed to both shear and bending stresses, tests were conducted using a 5,000,000-pound capacity universeal testing machine, under conditions paralleling those encountered in commercial application for highway bridges. While a composite steel-concrete bridge structure is, of course, among the primary applications of the invention, the beam per se was also tested under dead loading.

The beam subjected to test, the general details of which are depicted in FIGS. 6, 7, 8 and 9 was designed with the view that it would withstand, using webs less than 0.1 inch thick, the rather severe requirements, loads, stresses, etc., of Standard Specification H20–S16–44 of the American Association of State Highway Officials (AASHO). Further in this connection, the beam was designed to simulate the stress condition imposed under the said AASHO specification for a 64-foot highway bridge.

In overall dimensions the test beam was about 30 feet 4 inches in length, 40 inches in depth and 12 inches in width. Each web 50 was comprised of three sections which were welded to two vertical and appropriately spaced inner web splice plates 52 such that the end sections of the webs were approximately 9 feet in length with the center section being about 12 feet in length. The non-integral, opposed concave webs were about 0.07 inch (end sections and 0.09 inch (center section) thick, were fabricated from type 301 stainless steel and were welded to stainless steel channel sections 54 and 56. The channels were about 0.15 inch and formed of type 301 stainless. Base or flange plate elements 58 and 60, each of which was about 3/16 inch thick and 6 inches wide, were welded to the inner surfaces of the channels. On the basis of roadway surface, the weight of the beam or girder was about 11 lbs. per sq. ft. (of which the stainless steel weighed about 5 lbs. per sq. ft.). This compares more than rather favorably with the much heavier weight (about twice) that would be characteristic of an equivalent conventional or standard steel beam. Two U- or channel-shaped diaphragms 62 and 64 (about 0.1 inch thick) were employed substantially longitudinally the length of the webs and were located about halfway between the midpoint and respective longitudinal edges of the webs, as shown in FIG. 8. For purposes of test, a plurality of inverted, triangularly-shaped and transversely disposed, stiffening diaphragms 66 (1/8 inch thick) were also employed and were appropriately spaced along the beam as shown in FIG. 6, each of the transverse diaphragms being welded to one of the longitudinal diaphragms and to the channel flange closest thereto. The reason for using the transverse diaphragms is discussed hereinafter in connection with the tests performed. Two vertically and transversely disposed, full depth end plates (diaphragms) 68 (one of which is shown in FIGS. 6 and 7) of an inwardly curved configuration conforming to that of the webs were also used at the reaction points. It should be pointed out that these transverse end plates are advantageous since they provide additional strengthening and supporting characteristics, e.g., the end plates enhance the buckling resistance of the webs and should be utilized when it is expected that the working stress in the webs approaches the critical stress of the webs. Such a transverse supporting plate can also be used at a location where a particularly large force is applied to the beam.

Two tests were conducted with respect to the beam per se under static loading. A third test was performed with regard to the beam with a concrete slab superimposed thereon under dynamic loading and in the fourth and final test the beam plus slab structure was tested to destruction.

In the first static test, the beam was tested in what will be referred to as the normal or upright position, i.e., in the position in which the transverse stiffening diaphragms would be in the compression region of the beam in bending. One of the basic purposes of this first (as well as the second) static test was to confirm the expectation that the buckling characteristics of the structural members would not present any problem of consequence when the member was used as a beam. In the erection of, for example, a highway bridge, it is the responsibility of the beam to carry the dead load, including that of the concrete before it hardens (after the concrete hardens it acts in unison with the beam member). However, a fair period of time is involved merely for the concrete to harden. During this period, the beam has, relatively speaking, little lateral support. Too, the neutral axis is approximately at the mid-depth of the beam. Accordingly, the webs would be exposed to both shear and compressive stresses and, thus, confirmance of good buckling behavior (both laterally and locally) was deemed necessary. Thus, the first static test (as well as the second) was intended to parallel or simulate the action taking place when a concrete slab is poured on a beam in forming a composite slab-girder design.

Figure 10:
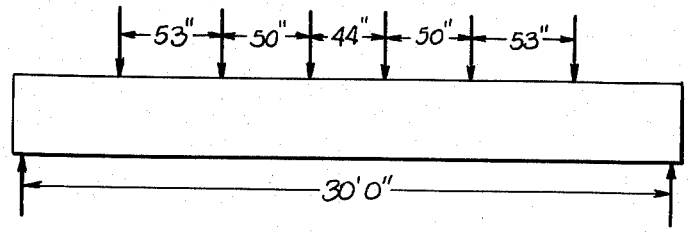
FIGURE 10 is a diagram illustrating the manner of loading the test beam under static testing.

Loads of increasing increments of 1 kip (1000 pounds) were applied at each of six locations as shown in FIG. 10 up to a maximum load of about 14 kips per load point. During the test, the loads were applied in a manner to produce bending and shear stress comparable to actual dead load stresses in a beam of about 64 feet in length, i.e., approximately double that for the beam subjected to test. (In all tests the member was supported over a span of 30 feet by bearing plates 9 inches in width which were welded to auxiliary built-up end diaphragms, the bearing plates being supported on knife edges 3 feet in length.) The beam was not supported laterally except for the support provided by the hydraulic jacks (located at each end) of the testing machine. Since the jacks had bearings at both top and bottom, there was no significant resistance to lateral movement. The concentrated loads were applied to the top flange through plates 12" x 1" x 1' (steel rollers 3" in diameter being placed between the jacks and the plates). The ends of the beam were free to rotate, but longitudinal movement was permitted only at one end. Standard SR-4 electrical resistance strain gages were employed to determine strains at various points on the beam and a 0.001-inch Ames Dial gage was used to measure the deflection of the beam at various points, including the midpoint thereof.

In the second static test, the beam was reversed (i.e., beam was loaded, so to speak, with the bottom flange on top) for the purpose of eliminating the effect of the transverse stiffening diaphragms and loading was again applied in the manner set forth with respect to the first position. In other words, the second test was intended to furnish information as to the effect of the stiffening diaphragm members 66 in preventing deformation of the webs. The position of the loading was the same as in the first test; however, since there were no transverse diaphragms on the compression side of the neutral axis in the reverse position, the load areas were spread out by placing a plate 12" x ¾" x 2' under each of the aforementioned 12" x 1" x 1' plates. Strain and deflection were again measured with the same instruments and loading was discontinued after a load of 12 kips per jack. It should be mentioned that in both the first and second tests care had to be exercised regarding the degree of loading in view of the fact that the beam was to be used in further tests.

The third test was intended to simulate live loading conditions as would be encountered with traffic loading. Further it was deemed appropriate to have information regarding fatigue life of the welds. In this test a concrete slab extending the length of the beam and being 7 inches thick by 7 feet wide was placed on top of the beam; however, the slab was not shored to insure that the beam was exposed to the full dead load. A plurality of both transverse (70) and longitudinal (not shown) steel reinforcing rods were used as shown in FIG. 11. The shear connectors 72 employed as shown in FIG. 11, were designed in accordance with AASHO specifications and consisted of 8-inch long pieces of 4-inch channel (5.4 lbs. per ft. ) which were welded to the top channel section of the beam, the welds being made with AISI No. 312 electrodes. Four pairs of 4-inch struts (not shown) were attached as diagonal diaphragms to the member at the ends and third points. One end of the diagonal strut channels was bolted to the concrete slab by means of inserts cast in the concrete and the other end was welded to the bottom of the beam at the location of the end and web splice plates.

In the dynamic or repeated load testing of the beam and concrete slab, loading was applied in a manner as shown in FIG. 12 and, in this connection, it should be mentioned that the load area was spread out by using timber blocking over a rectangular area of 63 inches in length (by 36 inches in width) as shown in FIG. 12. In the beginning of this test, a static load was first applied consistent with that desired to produce a desired stress level. Midspan deflection was measured and the repeated loading was initially applied such that midspan deflection was about equal to that under the first static load. Actually, periodic static loads were applied during the repeated or dynamic load testing to ascertain any changes in beam stiffness that might have developed during the test. As to the repeated loading, a cycling load of about 39 kips was initially applied at each area of loading and this loading was applied for 67,600 cycles at which time the loads were increased to and maintained at about 51 kips per jack until 600,000 cycles had been applied after which the test was discontinued. As in the previous tests, appropriately located gages were used for measurement purposes.

In the fourth and final test the beam plus slab was tested to destruction and the manner of loading is shown in FIG. 13. A load of 240 kips was applied before failure occurred. Appropriate instruments were used for various measurements, including deflection, slip, etc.

The tests confirmed that notwithstanding (1) that the webs were exceedingly thin, i.e., less than 0.1 inch, (2) that although the weight of the beam (apart from the minor weight of auxiliary structure) was approximately one-half of that which would have been required by a standard equivalent I-beam, and (3) that the member was designed for severe conditions of use, the beam responded very satisfactorily.

The ultimate (destructive) load test revealed that the beam carried an ultimate load of over twice that of the design working load. Midspan deflection under ultimate loading was substantially within the maximum limit imposed under H20-S16-44. In addition, fracture occurred in the lower base plate element at a butt weld. Failure did not occur in either the stainless steel channels or thin webs. Further, the entire cross section was effective in carrying the bending moment in the ultimate load test as was evident from a strain distribution diagram. End slip measurements taken during the destructive test were quite satisfactory.

The static tests also confirmed that even though the webs were less than 0.1 inch thick, no buckling problem of any consequence was involved, a factor attributable to, inter alia, the special configuration of the beam cross section. As indicated by the static tests, the effective EI (Young's modulus times moment of inertia) was about the same in both the normal and reversed positions. This would not be the case if buckling in some region of the cross section occurred. Strain readings indicated that the longitudinal parts of the cross section of the member were all quite effective in tests on both the beam per se and in combination with the concrete slab. The static tests further indicated that the transverse stiffening diaphragm members (66) were not essential and would not be required unless a designer wished to utilize the same when the severest conditions of application pertained.

The repeated load test indicated that fatigue life of the welds would not be a problem.

Moreover, the dynamic loading test failed to show that the beam would behave other than in a satisfactory manner under live loading. Also, it should be mentioned that the midspan deflections between the static loading and repeated loading in this test were very close. Thus, the test indicated that there would be no problem as to beam stiffness under traffic loading.

In summary of the tests conducted, it can be stated that the beam responded very well.

The aforedescribed structural members can be formed from a wide variety of materials, e.g., the plain or mild carbon steels, the low alloy and HSLA steels, including the copper-nickel steels, aluminum or other metals and alloys, suitable non-metallic materials, etc. However, as noted above herein, the lightweight construction of the members enables the well-known stainless steels including the ASTM and AISI series of stainless steels to be used. Of course, while other stainless steels can be employed, e.g., the ferritic and martensitic types, they do not afford the high degree of corrosion resistance conferred by the nickel-containing austenitic stainless steels, e.g., the AISI 300 and 200 series of austenitic stainless steels, including AISI types 201, 301, 302, 304, 316, etc., and with time would be less attractive in appearance after exposure to ambient atmospheric conditions. As is well known, the austenitic stainless steels generally contain about 3% to 25% nickel, about 15% to 30% chromium, up to 10% manganese, up to 3% silicon, carbon up to 0.25%, up to 5% molybdenum, up to 3% columbium, up to 3% titanium and the balance essentially iron. Various other elements are often present in the austenitic stainless steels. If desired, the channels, or webs can be formed of steel clad with stainless steels, i.e., a composite material having an exterior surface formed of stainless steel and the inner surface formed of plain, mild or low alloy steel. The techniques of forming stainless clad steel are so well known that elaboration thereupon is unnecessary herein.

A distinct feature of the present invention is that while the structural members are of light weight, they simultaneously have high strength-to-weight ratios capable of withstanding high loads. While aluminum is of light weight and is well contemplated within the instant invention, if used in accordance therewith, the resulting member will not carry, as a practical matter, the high loads as in the case of stainless steel or, for that matter, the plain, mild or alloyed steels. Aluminum, for example, having a lower modulus of elasticity than steel, would thus have lower critical stresses. However, in the case of aluminum, it should be pointed out that in view of its corrosion resistant characteristics, the lower critical stresses thereof can be offset by increasing web thickness. Nonetheless, it is more advantageous that the metals or alloys employed have a modulus of elasticity of not less than $27 \times 10^6$ p.s.i. and preferably of at least about $28 \times 10^6$ p.s.i. This would include the well known ASTM and AISI grades of carbon and low alloy steels (including the HSLA steels) and the stainless steels.

With respect to other features of the invention, the thickness of the channel (flange) sections can be varied in accordance with the requirements of intended use. For example, the thickness of the channels can be and advantageously is greater than that of the webs, or the bottom channel can be thicker than the upper channel which can be of the same thickness as the concave web sections. However, the thickness of the webs generally need not be greater than that of the channels. Similarly, while the webs can be exceedingly thin, e.g., 0.05 inch or less, greater thicknesses, e.g., up to about 0.15 or 0.20 inch, can be employed depending upon the stresses, loads, etc., to be encountered in use.

The web and channel members can be fabricated into preformed condition. Where applicable, extrusion techniques may be used. Press brakes can be employed to form the webs and in this instance, the webs will be essentially comprised of a plurality of relatively straight but continuously inwardly curved panels. To further minimize possible buckling tendencies and where at least one longitudinal diaphragm is used the region above the upper longitudinal diaphragm can be filled with a relatively non-compressible material, such as lightweight concrete, etc.; however, the use of the aforementioned transversely-disposed diaphragm stiffeners is preferable. Where desirable, particularly where structural members of considerable length are required, two or more members can be joined or connected to give the desired length as those skilled in the art will appreciate and as is exemplified by the test beam. This can be accomplished, for example, by welding, e.g., seam welding, the edges of the webs against appropriately located inside web plates (transversely disposed in relation to the length of the structural member) of suitable width and of a curved configuration conforming to that of the webs. The inside web plates (referred to as web splice plates in connection with the test beam aforedescribed) also advantageously provide additional strength to the member. The utilization of supporting end plates conforming to the configuration of the webs and transversely disposed with regard thereto is most preferable and advantageous in providing maximum resistance to loads and stress.

Struts, wind braces, and other auxiliary structures or substructure can be utilized as will be readily understood by the artisan. For example, pairs of struts can be utilized to bridge the distance between adjacent structural members of the invention used in highway bridges. The struts can connect the upper part of one beam with the lower part of an adjacent beam or each strut of a pair can extend from the lower part of the beams and meet at the underside of the roadway.

The present invention is applicable wherever structural members are used and particularly where corrosive environments are encountered. Beams for both short and long span bridges, including highway bridges, and for roofing and floor structures are exemplary uses. In addition, the structural supporting members can be for the underframes of trucks and the like, machinery elements such as booms, etc.

Although the present invention has been described in conjunction with preferred embodiments, it is to be understood that modifications and variations may be resorted to without departing from the spirit and scope of the invention, as those skilled in the art will readily understand.

Such modifications and variations are considered to be within the purview and scope of the invention and appended claims.

I claim:

1. A new and improved, load-supporting structural member characterized by lightweight construction, good durability and high strength, including high strength-to-weight ratios and high critical and allowable stresses, said structural member being comprised of oppositely disposed channel members characterized by a duplex structural configuration comprised of a channel flange section substantially encased by a section of nickel-containing austenitic stainless steel, a pair of relatively thin, smooth and continuous, concave webs formed of nickel-containing austenitic stainless steel and spaced apart in inwardly curved opposed relation with the extremities thereof being substantially straight and parallel to each other and being in affixed engagement with said channel members thereby forming a member having a substantially hollow interior, the channel members having a thickness greater than that of the webs with the webs having radii of curvature which are substantially equal, said member being further characterized in that the central angle subtended by the webs is not less than about 35° and not greater than about 90°, a pair of longitudinal diaphragms extending substantially the length of the structural member and being in affixed relation with each of the inner surfaces of the webs, said longitudinal diaphragms being oppositely disposed to and approximately equidistant from the longitudinal midpoint of the structural member, a plurality of internal stiffening diaphragms disposed in transverse relation to and spaced along substantially the length of the structural member, said stiffening diaphragms being in affixed engagement with one of the longitudinal diaphragms and with the channel member in closest proximity thereto, and a full depth end-plate diaphragm at each end of the structural member, said end-plate diaphragms being located within the respective interior end portions of the structural member and in transverse relation to the length thereof.

2. A new and improved, load-supporting structural member characterized by lightweight construction, good durability and high strength, including high strength-to-weight ratios and high critical and allowable stresses, said member being comprised of oppositely disposed channel members characterized by a duplex structural configuration comprised of a channel flange section substantially encased by a section of nickel-containing austenitic stainless steel, a pair of relatively thin, smooth and continuous, concave webs formed of nickel-containing austenitic stainless steel and spaced apart in inwardly curved opposed relation with the extremities thereof being substantially parallel to each other and in affixed engagement with said channel members thereby forming a member having a substantially hollow interior, the channel members having a thickness at least as great as the thickness of the webs with the webs having radii of curvature which are substantially equal, said member being further characterized in that the central angle subtended by the webs is not less than about 25° and not greater than about 120°, at least one longitudinal diaphragm extending substantially the length of the structural member and being in affixed relation with each of the inner surfaces of the webs, a plurality of internal stiffening diaphragms disposed in transverse relation to and extending substantially the length of the structural member, said stiffening diaphragms being in affixed engagement with a longitudinal diaphragm and with one of the channel members, and a full depth end-plate diaphragm at each end of the structural member, said end-plate diaphragms being located within the respective interior end portions of the structural member and in transverse relation to the length thereof.

3. A new and improved, load-supporting structural member characterized by lightweight construction, good durability and high strength, including high strength-to-weight ratios and high critical and allowable stresses, said structural member being comprised of oppositely disposed channel members having surfaces in substantially parallel relation which at their extremities extend into and form fillet sections having substantially equal radii of curvature and being of inwardly curved contour, a pair of relatively thin, smooth and continuous, concave webs which are spaced apart in inwardly curved opposed relation and in affixed engagement with the said fillet sections thereby forming a member having a substantially hollow interior, the channel members being of a thickness greater than that of the webs with the webs having radii of curvature which are substantially equal but which are greater than the radii of curvature of the channel sections, said member being further characterized in that the webs and the outer surface of at least one channel member are formed of nickel-containing austenitic stainless steels and that the central angle subtended by the webs is not less than about 35° and not greater than about 90°, a pair of longitudinal diaphragms extending substantially the length of the structural member and being in affixed relation with each of the inner surfaces of the webs, said longitudinal diaphragms being oppositely disposed to and approximately equidistant from the longitudinal midpoint of the structural member, a plurality of internal stiffening diaphragms disposed in transverse relation to and spaced along substantially the length of the structural member, said stiffening diaphragms being in affixed engagement with one of the longitudinal diaphragms and with the channel section in closest proximity to the said longitudinal diaphragm, a base plate element in engagement with the inner surface of each of said channel sections and extending substantially the length thereof, and a full depth end-plate diaphragm at each end of the structural member, said end-plate diaphragms being located within the respective interior end portions of the strucural member and in transverse relation to the length thereof.

4. A new and improved, load-supporting structural member characterized by lightweight construction, good durability and high strength, including high strength-to-weight ratios and high critical and allowable stresses, said member being comprised of oppositely disposed channel sections having surfaces in substantially parallel relation which at their extremities extend into and form fillet sections having substantially equal radii of curvature and being of inwardly curved contour, a pair of relatively thin, smooth and continuous, concave webs which are spaced apart in inwardly curved opposed relation and in affixed engagement with the said fillet sections thereby forming a member having a substantially hollow interior, the channel sections being of a thickness at least as great as that of the webs with the webs having radii of curvature which are substantially equal but which are greater than the radii of curvature of the channel sections, said member being further characterized in that the central angle subtended by the webs is not less than about 25° and not greater than about 120°, at least one longitudinal diaphragm extending substantially the length of the structural member and being in affixed relation with each of the inner surfaces of the webs, a base plate element in engagement with the inner surface of at least one of the said channel sections and extending substantially the length thereof, and a full depth end-plate diaphragm at each end of the structural member, said end-plate diaphragms being located within the respective interior end portions of the structural member and in transverse relation to the length thereof.

5. A load-supporting structural member as set forth in claim 4 wherein the channel sections and webs are formed of nickel-containing austenitic stainless steel.

6. A new and improved, load-supporting structural member characterized by lightweight construction, good durability and high strength, including high strength-to-weight ratios and high critical and allowable stresses, said structural member being comprised of oppositely disposed channel sections having surfaces in substantially parallel relation, a pair of relatively thin, smooth and continuous concave webs which have substantially equal radii of curvature and which are spaced apart in inwardly curved opposed relation and in affixed engagement with the channel sections thereby forming a member having a substantially hollow interior, a base plate element in engagement with the inner surface of at least one of the channel sections and extending substantially the length thereof, the base plate element being of a thickness greater than the thickness of the concave webs, said structural member being further characterized in that the central angle subtended by the webs is not less than about 25° and not greater than about 120°, at least one longitudinal diaphragm extending substantially the length of the structural member and being in affixed relation with each of the inner surfaces of the webs, and a full depth end-plate diaphragm at each end of the structural member, said end-plate diaphragms being located within the respective interior end portions of the structural member and in transverse relation to the length thereof.

7. A load-supporting structural member as set forth in claim 6 wherein the webs and the outer surface of at least one of the channel sections are of nickel-containing austenitic stainless steel.

8. A new and improved load-supporting structural member characterized by lightweight construction, good durability and high strength, including high strength-to-weight ratios and high critical and allowable stresses, said structural member being comprised of oppositely disposed channel sections having surfaces in substantially parallel relation, a pair of relatively thin concave webs which have substantially equal radii of curvature and which are in inwardly curved opposed relation and in affixed engagement with the channel sections thereby forming a member having a substantially hollow interior, the concave structural arrangement of the webs being continuous substantially throughout the depth of the webs with the webs being in spaced apart relation with respect to each other to prevent the occurrence of a detrimental hinge effect when the structural member is eccentrically loaded, a base plate element in engagement with the inner surface of at least one of the channel sections and extending substantially the length of the structural member, the base plate element being of a thickness greater than the thickness of the webs, said structural member being further characterized in that the central angle subtended by the webs is not less than about 35° and not greater than about 90°, at least one longitudinal diaphragm extending substantially the length of the structural member and being in affixed relation with each of the inner surfaces of the webs, and a full depth end-plate diaphragm at each end of the structural member, said end-plate diaphragms being located within the respective interior end portions of the structural member and in transverse relation to the length thereof.

References Cited by the Examiner
UNITED STATES PATENTS

| | | | |
|---|---|---|---|
| 1,454,659 | 5/1923 | Thurston et al. | 52—723 |
| 1,685,881 | 10/1928 | Nixon | 170—159 |
| 2,062,398 | 12/1936 | Coddington | 52—727 |

FOREIGN PATENTS

| | | |
|---|---|---|
| 180,074 | 5/1922 | Great Britain. |

RICHARD W. COOKE, JR., *Primary Examiner.*